US009297650B2

United States Patent
Nieminen et al.

(10) Patent No.: US 9,297,650 B2
(45) Date of Patent: Mar. 29, 2016

(54) METHOD AND ARRANGEMENT FOR DETERMINING ALTITUDE

(71) Applicant: Suunto Oy, Vantaa (FI)

(72) Inventors: Heikki Nieminen, Vantaa (FI); Erik Lindman, Vantaa (FI)

(73) Assignee: Suunto Oy, Vantaa (FI)

( * ) Notice: Subject to any disclaimer, the term of this patent is extended or adjusted under 35 U.S.C. 154(b) by 737 days.

(21) Appl. No.: 13/744,493

(22) Filed: Jan. 18, 2013

(65) Prior Publication Data

US 2013/0204567 A1    Aug. 8, 2013

Related U.S. Application Data

(60) Provisional application No. 61/649,624, filed on May 21, 2012.

(30) Foreign Application Priority Data

Feb. 3, 2012    (FI) .................................. FI20125115

(51) Int. Cl.
  *G01C 5/06*    (2006.01)
  *G01C 21/20*   (2006.01)
  *G01S 19/45*   (2010.01)
  *G01C 5/00*    (2006.01)
  *G01C 25/00*   (2006.01)

(52) U.S. Cl.
  CPC . *G01C 5/00* (2013.01); *G01C 25/00* (2013.01)

(58) Field of Classification Search
  CPC .......... G01C 5/06; G01C 21/20; G01C 21/12; G01S 19/40; G01S 19/45
  See application file for complete search history.

(56) References Cited

U.S. PATENT DOCUMENTS

| 5,646,857 | A  | * | 7/1997  | McBurney    | G01C 5/00  |
|           |    |   |         |             | 701/469    |
| 6,055,477 | A  |   | 4/2000  | McBurney    |            |
| 6,522,298 | B1 | * | 2/2003  | Burgett     | G01C 5/06  |
|           |    |   |         |             | 342/357.25 |
| 6,798,378 | B1 | * | 9/2004  | Walters     | G01C 5/00  |
|           |    |   |         |             | 342/357.57 |
| 6,862,525 | B1 | * | 3/2005  | Beason      | G01C 21/20 |
|           |    |   |         |             | 701/454    |
| 6,970,795 | B1 | * | 11/2005 | Burgett     | G01C 5/06  |
|           |    |   |         |             | 342/357.25 |
| 7,324,002 | B2 |   | 1/2008  | Iso-Heiko   |            |
| 8,779,971 | B2 | * | 7/2014  | Wellington  | G01C 21/20 |
|           |    |   |         |             | 342/357.36 |
| 2005/0134467 | A1 |   | 6/2005 | Iso-Heiko et al. |   |

(Continued)

FOREIGN PATENT DOCUMENTS

EP    1190261 A1   11/2000
JP    10227042 A   2/1997

*Primary Examiner* — John Breene
*Assistant Examiner* — Jeffrey Aiello
(74) *Attorney, Agent, or Firm* — Terence P. O'Brien (57) ABSTRACT

The invention relates to a portable electronic device and method for determining altitude. The device can comprise a satellite-positioning sensor for determining the elevation of the device on the basis of satellite data, a barometric sensor for measuring atmospheric-pressure information and/or an acceleration sensor for measuring acceleration information, and means for determining the altitude reading on the basis of the satellite-based elevation and the atmospheric-pressure and/or acceleration information. According to the invention, the means for determining the altitude reading are arranged to calculate a corrected altitude reading with the aid of the rate of change in elevation determined at least partly on the basis of the elevation determined on a satellite basis and atmospheric-pressure and/or acceleration information. With the aid of the invention, the altitude profile of exercise can be measured precisely.

24 Claims, 4 Drawing Sheets

(56) References Cited

U.S. PATENT DOCUMENTS

| | | |
|---|---|---|
| 2007/0067137 A1 | 3/2007 | Ohkubo et al. |
| 2010/0170337 A1 | 7/2010 | Ahlstrom |
| 2011/0077898 A1* | 3/2011 | Loomis .................... G01C 5/00 702/141 |
| 2011/0106449 A1 | 5/2011 | Chowdhary et al. |
| 2012/0072110 A1* | 3/2012 | Venkatraman ........... G01C 5/06 701/434 |
| 2012/0316831 A1* | 12/2012 | Klinghult ................. G01C 5/06 702/166 |
| 2013/0133421 A1* | 5/2013 | Katz ........................ G01C 5/06 73/490 |

* cited by examiner

METHOD AND ARRANGEMENT FOR DETERMINING ALTITUDE

RELATED APPLICATIONS

The present application claims priority to Finnish Patent Application Serial No. FI20125115 filed on Feb. 3, 2012. The present application also claims priority to U.S. Provisional Patent Application Ser. No. 61/649,624 entitled METHOD AND ARRANGEMENT FOR DETERMINING ALTITUDE and filed on May 21, 2012.

FIELD OF THE INVENTION

The present invention relates generally to the determining of altitude, particularly using a portable device, which has at least two sensors suitable for altitude measurements.

BACKGROUND OF THE INVENTION

Altitude can be measured purely with the aid of atmospheric pressure, because the air pressure of the atmosphere changes as a function of altitude. This means that variations in atmospheric pressure that are not caused by a change in the elevation of the sensor will nevertheless introduce a significant error source to the measurement. In such devices, the base level of the atmospheric pressure should also be manually calibrated, in order to define absolute altitude. In addition to atmospheric pressure, variations in temperature can also decisively affect known measurement methods based on atmospheric pressure.

As an example of a drawback in known methods, it is possible to refer to a situation, in which a rapid climb takes place simultaneously with a rapid temperature change. In that case, a large error can be included in the altitude reading after the climb, even though the reading might have been entirely correctly calibrated before the climb, and major changes did not take place in the general weather conditions in the area. Should the weather conditions also change at the same time; the error can be even greater.

To allow for error sources, various methods have been developed in determining altitude, in which a second sensor is utilized in addition to a barometric sensor. For example, with the aid of an acceleration sensor it is possible to detect whether a person is stationary or moving, and, on the basis of this information, the information provided by the barometric sensor can be filtered. On the other hand, FI Publication No. 119297 discloses a method, in which the Earth's magnetic field being also measured using a magnetic sensor, pressure information is measured, and the pressure information is used both as atmospheric-pressure information and to determine the elevation. Consecutive measurements are performed using the magnetic sensor, and the consecutive measurement results are compared and, on the basis of the comparison, the mobile device is directed to either atmospheric-pressure measurement or altitude measurement, or the desired altitude is set for the mobile device.

U.S. Pat. No. 7,324,002 discloses the giving of a weather alert based on determining elevation, with the aid of a wrist-top device.

In several known methods a satellite-positioning sensor is utilized. U.S. Pat. No. 6,055,477 discloses the calculation of the offset error of an altimeter (e.g., based on atmospheric pressure) with the aid of GPS altitude measurement. The offset error of the altimeter is calculated with the aid of a single-state Kalman filter.

For example, U.S. Pat. No. 6,522,298 discloses a method for calibrating an altimeter with the aid of GPS (Global Positioning System). In one embodiment of the method, changes in pressure are measured and a mean value is calculated recursively for an error estimate of the pressure at zero altitude (reference altitude). If changes are detected with the aid of the error model, which cannot be explained by changes in altitude, it is concluded that they have been caused by the environment.

U.S. Pat. No. 6,768,449 discloses a method for calculating a calibrated altitude, which method utilizes the pressure at a reference altitude. In one embodiment, an error model of the pressure at a reference altitude is updated with the aid of difference between GPS and pressure measurements.

In U.S. Pat. No. 7,142,152, a calibration model of the pressure at a reference altitude is again used, which takes into account not only the static offset error, but also the dynamic error, i.e. the error change in the time plane.

A common factor in the methods described in U.S. Pat. Nos. 6,522,298, 6,768,449, and 7,142,152 is that the barometric altitude is always calculated. On the basis of the barometric altitude and the GPS altitude, the calibrated pressure at sea-level is calculated (the reference level of the pressure). The final altitude based on pressure is then calculated with the aid of the calibrated sea-level pressure.

It can be said generally that many known methods rely heavily on a GPS-calibrated, but nevertheless strong atmospheric-pressure-based definition, and in many situations their ability to allow for error sources relating especially to temperature and changes in weather is poor. There is therefore a need for new, improved methods.

SUMMARY OF THE INVENTION

The present invention is intended to eliminate at least some of the aforementioned drawbacks. One intention of the invention is to create a method, in which the relative altitude profile of exercise can be given the correct shape during the exercise. A second intention is to create a method, which also permits absolute altitude to be determined. A third intention of the invention is to create precise absolute altitude and a precise altitude profile, without knowing the air temperature or the atmospheric pressure at the reference level. The above-listed intentions are representative only and are not intended represent the full intent of the invention.

In the invention, a remote positioning system able to provide altitude information, such as a satellite-positioning system as well as measurement based on an atmospheric-pressure sensor (barometric sensor) and/or an acceleration sensor, is utilized in a new way. In one preferred embodiment of the invention, correct altitude information is provided by a remote positioning sensor with the aid of the rate of change of the atmospheric pressure and/or acceleration information.

According to one aspect of the present invention, a portable electronic device for determining altitude can include: a satellite-positioning sensor for determining the elevation of the device on the basis of satellite data, or means for receiving altitude-position information from a separate unit comprising a satellite-positioning sensor; a barometric sensor for measuring atmospheric-pressure information, or means for receiving atmospheric-pressure information from a separate unit comprising a barometric sensor; and means for determining a corrected altitude reading at least partly with the aid of an elevation determined on a satellite basis and on the basis of the rate of change of the elevation calculated with the aid of the rate of change of atmospheric pressure or acceleration information.

Instead of, or in addition to the rate of change of altitude provided by the barometric sensor, it is possible to utilize acceleration information provided by the acceleration sensor in order to detect changes in altitude over a shorter time scale. Thus, the device can comprise an acceleration sensor for measuring acceleration, or means for receiving acceleration information from a separate unit comprising an acceleration sensor. The means for determining a corrected altitude reading can be arranged to determine the altitude reading at least partly with the aid of the rate of change in atmospheric pressure, in addition to, or instead of the acceleration-based vertical speed.

The term "rate of change of the elevation" can be stated more briefly by the concept "vertical speed". The vertical speed can be calculated on the basis of either the rate of change of atmospheric pressure, or of acceleration information, or of a combination of these. The term "rate of change of atmospheric pressure" also covers derivatives of this, such as vertical speed, which are obtained when the atmospheric-pressure information is converted into altitude information, on the basis of a suitable model.

The term "satellite positioning" comprises both positioning based on positioning information transmitted by satellites in orbit above the Earth and positioning based on information transmitted by positioning base stations located on the surface of the Earth.

Considerable advantages are achieved with the aid of the invention. Satellite-based altitude determining contains a great deal of noise, but its average level corresponds well to reality. On the other hand, with the aid of pressure measurement, changes in altitude can be detected precisely and rapidly. For its part, the use of an acceleration sensor allows really rapid changes in altitude to be measured precisely. Combining these according to the invention provides measurement that is both accurate and reacts quickly to changes in altitude.

More specifically, satellite-based altitude can be assumed with good precision to contain only a normally dispersed error. However, this random error in altitude over a short time interval (from seconds to tens of minutes) is considerably greater than the error in a pressure sensor. Satellite-based vertical speed therefore contains a considerable amount of error. The random error, i.e. noise of a pressure sensor is very small over a short time interval. However, a pressure sensor can exhibit considerable slowly-changing error sources in calculated altitude, if the sensor has not been calibrated. These slowly changing errors are due to the differences between the sea-level atmospheric pressure contained in the model and the real sea-level atmospheric pressure, as well as those between the air temperature contained in the model and the real air temperature. Due to these errors, the altitude given by a pressure sensor cannot as such be used in altitude fusion. But because the short-time random error of a pressure sensor is very small, the relative altitude change, i.e. vertical speed given by a pressure sensor is very accurate. However, the dynamic response range of a pressure sensor is limited to about one Hertz. An acceleration sensor can be used to measure even more rapid changes in altitude. When the distribution and behaviour of errors have been studied especially in the frequency plane, with the aid of the present invention a device and method have been obtained, in which satellite, pressure, and optionally also acceleration measurements have been exploited in a new and advantageous manner.

With the aid of the invention, an altimeter that is well corrected also in terms of weather changes is achieved. Satellite-based determining is not dependent on weather changes, whereas correction taking place on the basis of pressure is performed over short period of time, during which weather changes are extremely small. Thus, the present method is relatively immune, for example, to changes in temperature and atmospheric pressure, which, on the other hand, appear directly in the results of many known altitude-determining methods.

One significant advantage of the invention is that the altitude profile of continuous exercise is made as correct as possible, because it is not "spoiled" by profile errors. Known methods, in which the base level ("sea-level pressure") of a pressure-based altitude definition is continuously calibrated with the aid of satellite positioning, can lead to even large profile errors, for instance, due to weather changes, which are difficult or impossible to take into account using the methods in question. In the present method, there is no feedback from satellite altitude to the altitude determining performed on the basis of pressure, which considerably reduces the creation of profile errors. In the invention, atmospheric pressure and/or the rate of change in atmospheric pressure, and thus also the altitude reading or vertical speed based on them, are determined entirely independently of satellite positioning.

With the aid of the invention, not only the measurement accuracy, but also the dynamic range of the measurement can be increased, compared to an altitude measurement made with the aid of only a single method.

One advantage of the invention is that the power consumption of the device or measurement system can be kept low, because both sensors—and particularly the satellite-positioning sensor—need not be switched on the whole time.

According to a principal aspect of a preferred form of the invention, a system for determining altitude includes a portable electronic device, a satellite-positioning sensor coupled to the device, a barometric sensor and/or an acceleration sensor coupled to the device, and a processor coupled to the device. The satellite-positioning sensor is configured for determining a satellite-based elevation of the device on the basis of satellite data. The barometric sensor is configured for measuring atmospheric-pressure information at the device. The acceleration sensor is configured for measuring acceleration information of the device. The processor is configured for determining an altitude reading on the basis of the satellite-based elevation, and at least one of the atmospheric-pressure information and the acceleration information. The processor is arranged to calculate a corrected altitude reading with the aid of a rate of change of the elevation determined at least partly on the basis of a satellite-based determined elevation and at least one of the atmospheric pressure information and the acceleration information.

According to another principal aspect of a preferred form of the invention, a method for determining altitude of a portable electronic device including the steps of measuring the elevation of the device with the aid of a satellite-positioning system, and measuring atmospheric pressure with the aid of at least one of a barometric sensor and an acceleration sensor. The method further includes the step of determining a corrected elevation on the basis of a satellite-based measured elevation and at least one of an atmospheric-pressure measurement and an acceleration measurement. The corrected elevation is determined at least partly by correcting the satellite-based determined elevation afterwards on the basis of the rate of change of the elevation detected on the basis of at least one of the atmospheric-pressure measurement and the acceleration measurement.

This invention will become more fully understood from the following detailed description, taken in conjunction with the accompanying drawings of some embodiments and advantages of the invention described herein below, and wherein like reference numerals refer to like parts.

In the following, are described in greater detail, with reference to the accompanying drawings.

DETAILED DESCRIPTION

The present invention can be implemented as a single device unit, or as a system of several separate device units. Above and hereinafter, unless otherwise stated, the term "device" refers to a device unit, which that includes elements and/or configurations for creating a corrected altitude reading. Typically, a device can include a microprocessor or microcontroller, as well as suitable (embedded) software, or some other suitable computation unit.

The device is preferably a wrist-top device ("wrist-top computer") and the other possible device units are remote devices linked wirelessly to the wrist-top device. The remote devices can be units without displays (such as a separate satellite-positioning unit, (a "GPS pod")) or units with displays (such as a mobile smart phone, in which there is a GPS unit). On the other hand, the device itself can be a pod without a display, in which case it will be configured for transmitting the result of the altitude calculation to another device for display and/or storage.

The device itself can also be, for example a mobile smart phone or a satellite navigator. The device can comprise elements configured for transmitting measurement data, and/or altitude, position, or other data calculated on their basis to a remote server, either directly or through, for example, a mobile smart phone in the vicinity of the device, to which the device is linked wirelessly. Alternatively, the device and remote devices can be coupled via a wired connection. The server can be updated continuously or from time to time. The user of the device or other users of the service can view from the server the measurement data and/or the altitude, position, or other data calculated on their basis either in real time or afterwards from any communications device whatever comprising a suitable browser or application. Further analysis or refining of the data can also be performed on the server.

Figure 1:
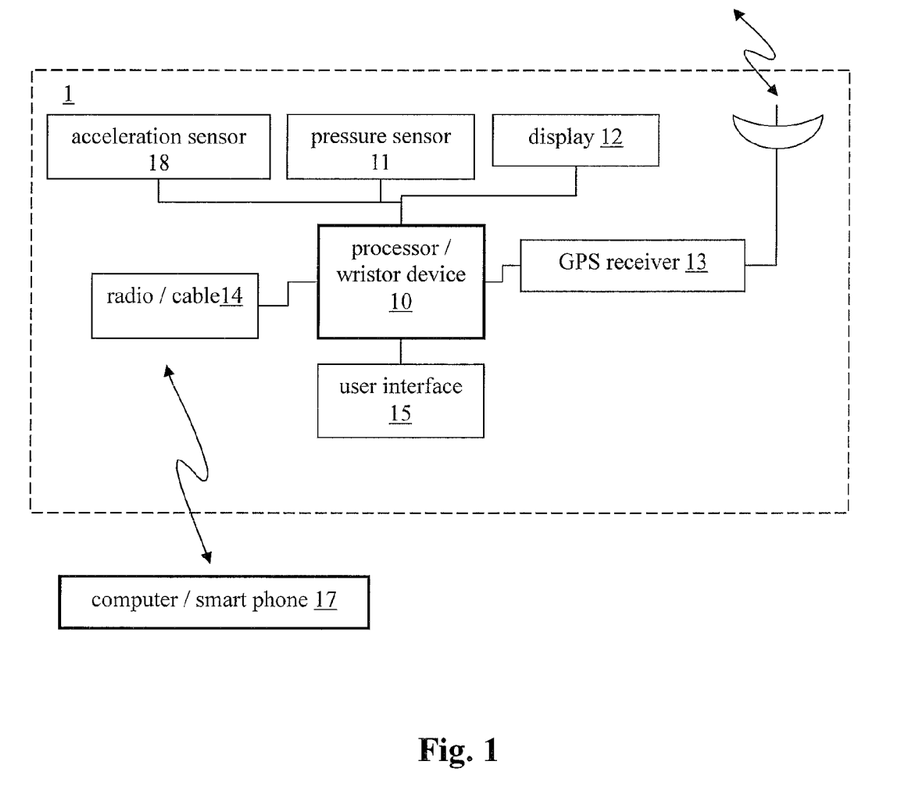
FIG. 1 shows a system according to one preferred embodiment of the present invention.

FIG. 1 shows one representative preferred embodiment, in which the device 1 comprises a computation unit 10, a pressure sensor 11 for measuring atmospheric pressure, an acceleration sensor 18, a GPS receiver 13 for determining satellite-positioning or at least satellite-based elevation information. In addition, the device comprises a display 12 and an interface 15 for operating the device's functionalities. In the device, there is preferably also a wireless or wired connection unit 14, through which the device can be connected to an external device 17, such as, for example, a computer, tablet, personal digital assistant or a smart phone. Measurement data can be transferred through the connection unit 14 to an external device 17, or, on the other hand, data from it in the direction of the present device.

Figure 2:
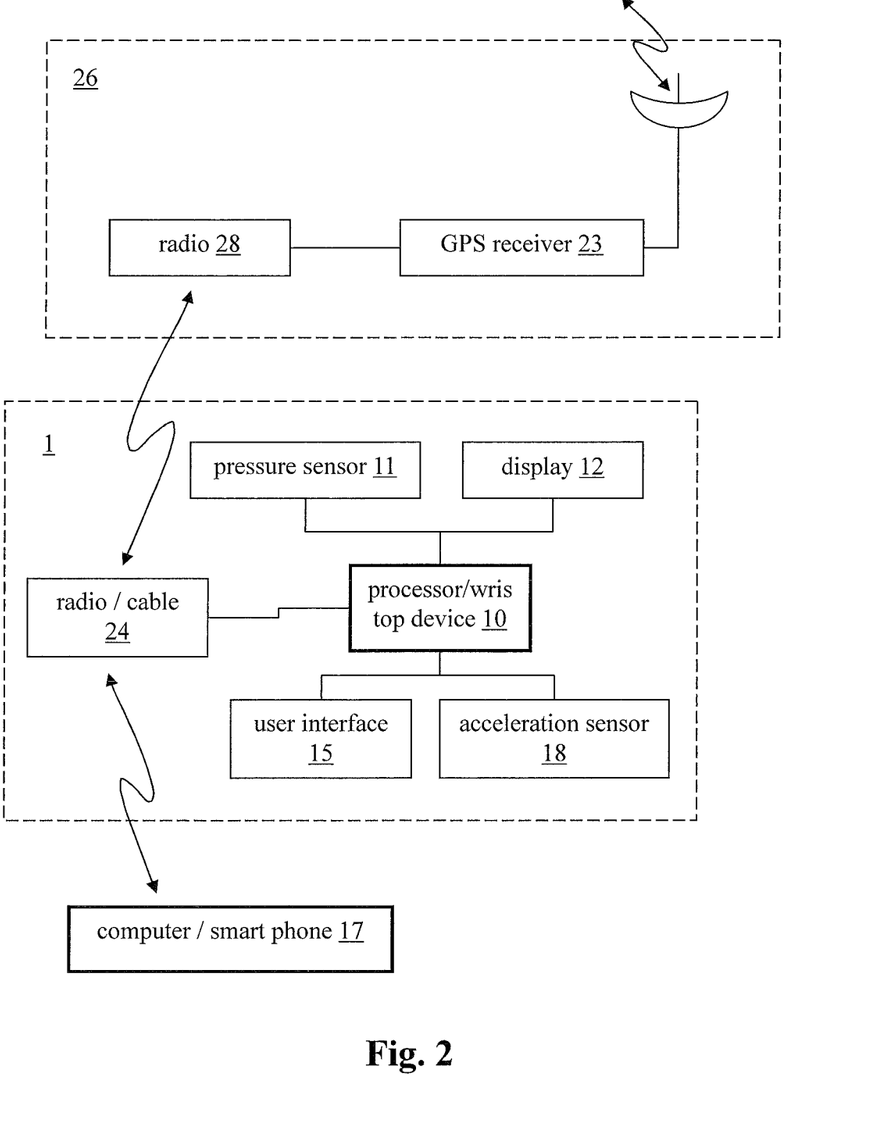
FIG. 2 shows a system according to a second preferred embodiment of the present invention.

FIG. 2 shows a system that otherwise corresponds to that of FIG. 1, but in this preferred embodiment, a GPS receiver 23 is located in a separate unit 26, to which is also connected a wireless communications unit 28, preferably a unit operating on a radio frequency, which is arranged to be connected to a connection unit 24 on the device 1. The connection unit 24 is a communication or interface unit. The connection unit 24 and the communications unit 28 can transmit and/or receive signals and/or data wirelessly or through wired connections. In one preferred embodiment, the communication unit 24 and the communications unit 28 can be configured to process radio communication signals. In other embodiments, other forms of communication can be used. In one particularly preferred embodiment, the separate unit 26 does not include a display.

Figure 3:
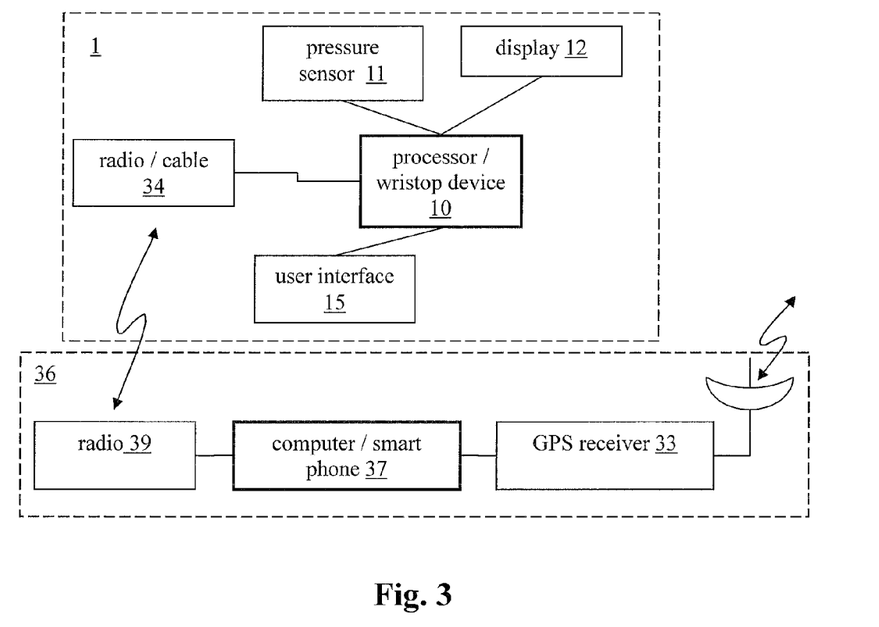
FIG. 3 shows a system according to another preferred embodiment of the present invention.

FIG. 3, on the other hand, shows another preferred embodiment, which utilizes a GPS receiver 33 contained in an external computer, a mobile smart phone, or some other unit 36 with a display. Again, the unit 36 comprises a communications unit 39 (such as a wireless communications unit), which is in a data-transfer link with a connection unit 34 of the device 1. If necessary, GPS data can be pre-processed in a processor 37 contained in the unit 36. The connection unit 34 and the communications unit 39 can transmit and/or receive signals and/or data wirelessly or through wired connections. In one preferred embodiment, the communication unit 34 and the communications unit 39 can be configured to process radio communication signals. In other embodiments, other forms of communication can be used.

As briefly described above, in the computation unit 10, a corrected altitude reading is calculated, at least partly on the basis of the satellite-based determining of elevation, the rate of change of atmospheric pressure, and vertical speed calculated from an acceleration sensor. Satellite-based altitude-position data, as also atmospheric-pressure data or data on the rate of change of atmospheric pressure, as well as acceleration data are stored for this purpose at least temporarily in a memory unit in or associated with the device. The corrected altitude reading preferably can be stored in the memory, in order to retain an altitude history.

The acceleration sensor and the utilization of acceleration can be used as part of an altitude fusion calculation according to the invention but it is not essential. Instead, such configuration forms an optional part of the invention, which can be used to incorporate and/or exploit state-of-motion and/or altitude changes over even a very short time scale. An acceleration sensor is useful for detecting changes in elevation taking place particularly with a time scale of 0-2 s, a pressure sensor with a time scale of 1 s-60 min, and a satellite-positioning sensor with a time scale of 1-∞ min. With the aid of the embodiments of the present invention, however, the information of the sensors can be combined in such a way that the dynamic range of the corrected altitude will in practice cover the entire time scale.

The elevation determined on a satellite basis is preferably calculated statistically on the basis of several satellite-based altitude measurements, for example, as a mean value, in order to obtain the most precise initial value possible for altitude. The satellite-positioning sensor can be switched on for this for the necessary time, which can be, for example, 10 s-5 minutes. Correspondingly, the passive period of the satellite positioning can be, for example, 10 s-2 h, typically 1 min-1 h. The necessary times can also be determined dynamically, on the basis of the reliability of the positioning. Alternatively, the change to a passive state can take place in response to a command by the user.

Keeping the satellite-positioning sensor in a passive state as much as possible is advantageous, as this saves a significant amount of energy, and can prolong battery life or the operational life of the GPS receiver, the device 1 or other units For example, the reliability of the GPS positioning can be assessed directly from parameters according to the GPS standard depicting precision, such as the Horizontal Dilution of Precision (HDOP).

When the satellite-positioning sensor is switched on, the elevation to be shown to the end user, or to be stored, can be determined either on the basis of purely satellite-positioning information, purely atmospheric-pressure information, purely acceleration information, or combinations of the these information sources, according to different preferred embodiments of the invention. Various representative situations are described in greater detail below.

The corrected altitude reading can be determined, for example, as follows:
- a correction term for the altitude reading can be calculated on the basis of the rate of change of the atmospheric pressure and the time factor, and
- the correction term can be added to the elevation determined on a satellite basis, in order to obtain a corrected altitude reading.

The correction term for the altitude reading can be calculated, for example, by determining an estimate for vertical speed on the basis of the rate of change of the atmospheric pressure, i.e. for the real rate of change of altitude. After this, the correction term for the altitude reading can be obtained simply by multiplying the vertical speed by the time used for the change in elevation.

Stated mathematically, the arrangement for determining the altitude reading can be arranged to utilize essentially the equation $$H_{t+1} = H_t + V_t \Delta t,$$

in which $H_{t+1}$ is the new corrected altitude reading, $H_t$ is the previous corrected altitude reading, or the altitude reading determined directly on a satellite basis, $V_t$ the vertical speed determined on the basis of atmospheric pressure, and $\Delta t$ is the time factor between the moments of time t and t+1.

If an acceleration sensor is used, the vertical-speed factor $V_{t,acc} \Delta t$ calculated on the basis of the acceleration sensor's data can additionally be taken into account in the corrected altitude reading, in the same way as the vertical-speed factor based on pressure measurement.

The time factor, over which the change in altitude at any time is calculated on the basis of vertical speed, can be, for example 1s or more, however preferably at most 600 s and typically at most 120 s, in order to obtain a sufficient response time and precision for the measurement. The time factor can be changed dynamically during operation. The precision of the determining can be increased by raising the measurement frequency and the power consumption can be reduced by decreasing the measurement frequency.

Every time a new corrected altitude reading has been calculated, it can be shown on the device's display, and/or saved.

The reliability of the measurements and/or the corrected altitude reading can be estimated mathematically using suitable arrangements. This can be done be estimating separately the data and/or system-error estimates relating to separate measurements. Known methods exist for this. If the arrangements for determining the altitude reading are arranged to use an iterative or recursive algorithm, which is arranged to make the altitude reading more precise on the basis of measurement data, the reliability of the final result can be evaluated on the basis of the stabilization time of the algorithm.

The reliability of the satellite-based elevation is preferably determined at least when changing the satellite-positioning sensor from an active to a passive state, so that it will be known whether the elevation in question can be used as a basis for calculation, or whether perhaps the altitude determined directly on the basis of atmospheric pressure would be more reliable. In the latter case, it is possible to move to a state, in which the altitude based directly on atmospheric pressure, which can be determined by as such known methods, is displayed to the user.

According to one embodiment, when the satellite-positioning sensor is in a passive state, the means for determining the altitude reading can be arranged to use the last satellite-based altitude reading determined when the satellite-positioning sensor was in an active state, or a corrected altitude reading determined after this.

In the device, there can be at least two different operating states or alternative computation models, in which the determining of the final altitude reading is performed in different ways. For example, in one operating state or computation model, the altitude reading can be arranged to be determined as a corrected altitude reading according to the invention, and in the second, on the other hand, as a direct satellite-based measurement, or directly on the basis of atmospheric pressure. The operating state or computation model can be changed, for example, by an action of the user, or on the fly on the basis of initial measurements or the reliability estimate of the final altitude reading.

Figure 4:
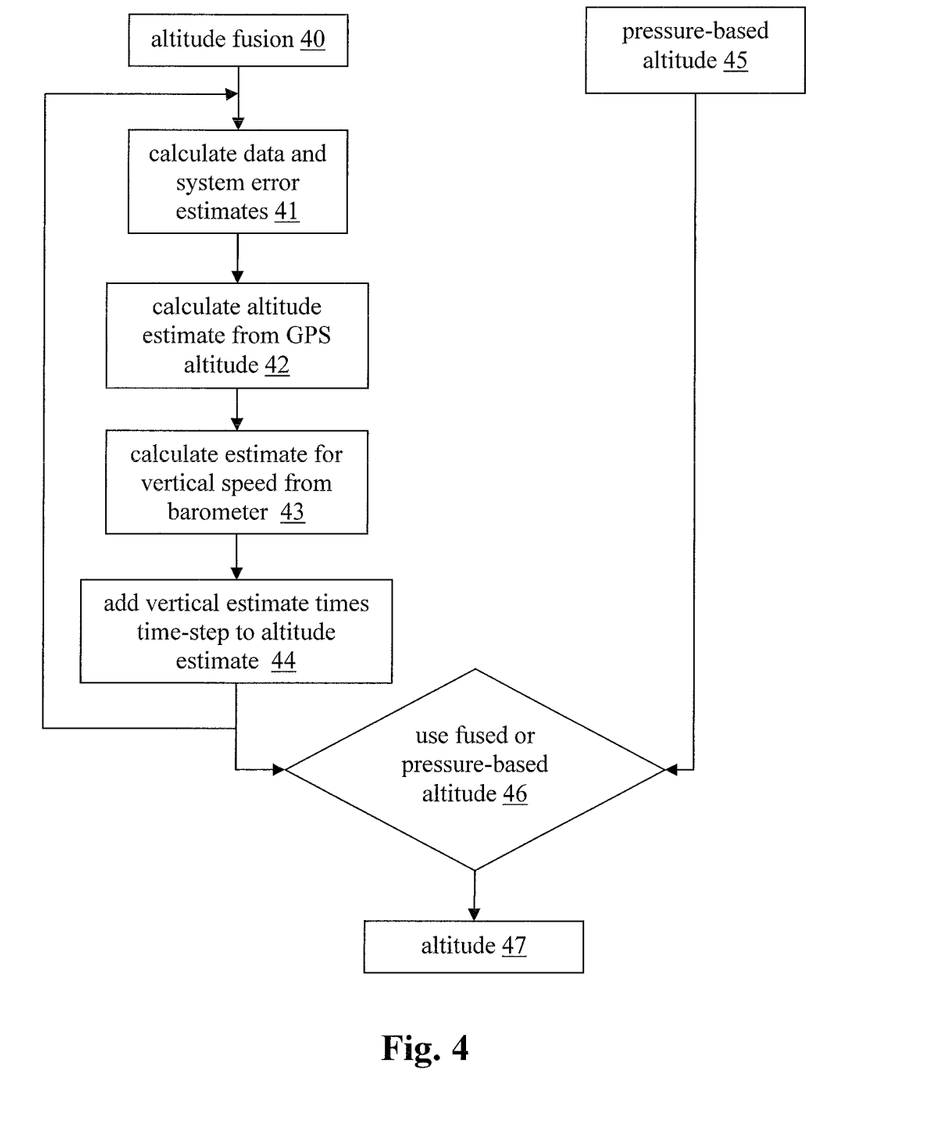
FIG. 4 shows a method according to one preferred embodiment of the present invention.

FIG. 4 shows as a flow diagram a model, in which an altitude fusion calculation 40 according to one preferred embodiment is shown on the left-hand side. The calculation comprises the estimation 41 of the reliability of a satellite-based altitude measurement and atmospheric-pressure measurement, calculation 42 of a satellite-based altitude estimate, calculation 43 of atmospheric-pressure-based vertical speed, and the combination 44 of these to arrive at a calculated or estimated altitude. The calculations and estimates can be repeated as indicated. On the right-hand side, the direct determination of atmospheric-pressure-based altitude 45 can be provided. In stage 46, a selection is made as to which determining procedure will be used, before the final altitude 47 is notified to the user.

According to one preferred embodiment, only if the reliability for the satellite-based elevation meets predefined criteria are the arrangements for determining the altitude reading arranged to utilize the altitude reading in question, or a corrected altitude reading calculated on its basis, when determining a new corrected altitude reading. For example, in a poor GPS field, it can be preferable to determine the altitude reading using some other method.

According to one preferred embodiment, the altitude is calculated according to the method in the first stage only on the basis of the data of the pressure sensor. Simultaneously, however, calculation is started of an estimate for the altitude as a fusion of satellite and atmospheric-pressure data, according to the invention. Once the estimate of the altitude fusion calculation is sufficiently precise, the method changes to use the value given by the altitude fusion. The condition for when the method changes to use the altitude fusion can be the mean stabilization time of the fusion calculation, or some other variable that is calculated, for example, from parameters depicting the precision given by the GPS, such as horizontal dilution of precision (HDOP).

According to another preferred embodiment, the device comprises memory for storing the earlier atmospheric-pressure data, or altitude data calculated from them, and the device or remote device can estimate the reliability of the measurements and/or of the corrected altitude reading. If the selected reliability factor meets, or the selected reliability factors meet the predefined criteria, the device is arranged to correct the previous altitude values measured with the aid of only the atmospheric pressure by using a suitable constant. The profile of the altitude graph of the entire exercise will then remain as correct as possible, irrespective of whether its various parts were determine using different methods. In other words, when the manner of determining changes, visible changes do not appear in the altitude profile as a result of the changes, instead the shape of the profile stored in the device corresponds to the real altitude profile defined by the landform and the route.

Accurate altitude information is especially important when navigating in mountainous areas. The invention can be combined with navigation applications, for example in such a way that the device comprises the capability to calculate direction and/or distance to a defined navigation point, with the aid of the said satellite-positioning sensor and/or a compass, and the capability to show on a display the direction and/or distance, as well as the altitude reading, preferably the corrected altitude reading and/or an altitude reading determined directly on a satellite or atmospheric-pressure basis, or the difference in altitude to the navigation point.

The navigation can naturally use the same satellite receiver as the altitude determining. A weakness in existing navigation applications has traditionally been precisely the reliability of the determining of altitude, which can be improved using the fusion technology according to the invention.

If the device comprises an acceleration sensor for measuring acceleration data based on the acceleration of the device, the device can be arranged to utilize the acceleration data in exceptional circumstances. An exceptional state of motion can be detected, for example, during a parachute jump, when due to the dynamic response time the barometric sensor will not react sufficiently rapidly, but a precise value for the vertical speed can be calculated from an acceleration sensor with a rapid dynamic response. For example, in such a case, suitable logic can be programmed into the device, which will replace the vertical speed given by the pressure sensor entirely with an acceleration-sensor-based vertical speed, or complement it with an acceleration-sensor-based vertical speed in the calculation described above in greater detail.

The corrected altitude reading determined according to the invention can be used in any further application. For example, the giving of a weather alert, as disclosed in U.S. Pat. No. 7,324,002 (and incorporated by reference), in which case the fusion altitude according to the invention can be used as the real altitude of the weather alert and the need for a weather alert can always be calculated, not only when satellite positioning is switched on, but also when it is on only intermittently. In such a method, a weather alert is given if it is detected that the atmospheric pressure changes greatly but the change cannot be explained by a change in real altitude.

Mathematical Model

Once the behaviour of the errors of the measurements is known, an optimal way to combine them can be created. The present invention includes the creation of a statistical linear model depicting the system, as follows $$X_{k+1} = AX_k w_k$$

in which X is the states of the linear model, w depicts the random errors of the states, and the matrix A depicts the behaviour of the states in a time plane, as follows $$A = \begin{bmatrix} 1 & T \\ 0 & 1 \end{bmatrix}$$

The state vector X is formed of the altitude (h) and the vertical speed (v)

$$X_k \begin{bmatrix} h_k \\ v_k \end{bmatrix}.$$

In addition, we can combine the measurements in the state vector as follows $$Y_k = HX_k + z_k,$$

in which the matrix H $$H = \begin{bmatrix} 0 & 1 \\ 1 & 0 \end{bmatrix}$$

combines the measurements $$Y_k = \begin{bmatrix} h_k^{pressure} & v_k^{pressure} \\ h_k^{gps} & v_k^{gps} \end{bmatrix}$$

in the state vector X.

While the preferred embodiments of the invention have been illustrated and described, it will be appreciated that various changes can be made therein without departing from the spirit and scope of the invention. One of skill in the art will understand that the invention may also be practiced without many of the details described above. Accordingly, it will be intended to include all such alternatives, modifications and variations set forth within the spirit and scope of the appended claims. Further, some well-known structures or functions may not be shown or described in detail because such structures or functions would be known to one skilled in the art. Unless a term is specifically and overtly defined in this specification, the terminology used in the present specification is intended to be interpreted in its broadest reasonable manner, even though may be used conjunction with the description of certain specific embodiments of the present invention.

What is claimed is:

1. A system for determining altitude comprising:
   a portable electronic device;
   one of a first satellite-positioning sensor coupled to the device, the satellite-positioning sensor configured for determining a satellite-based elevation of the device on the basis of satellite data, and a mechanism for receiving altitude-position information from a first separate unit including a second satellite-positioning sensor;
   at least one of a first barometric sensor for measuring atmospheric-pressure coupled to the device, a mechanism for receiving atmospheric-pressure information from a second separate unit including a second barometric sensor, a first acceleration sensor for measuring atmospheric-pressure information coupled to the device, and a mechanism for receiving acceleration information from a third separate unit including a second acceleration sensor; and
   a processor coupled to the device, the processor configured for determining an altitude reading on the basis of the satellite-based elevation, and at least one of the atmospheric-pressure information and the acceleration information, the processor arranged to calculate a corrected altitude reading with the aid of a rate of change of the elevation on the basis of at least one of a satellite-based determined elevation data, and the atmospheric pressure information and/or the acceleration information based on dynamic response time of the atmospheric pressure information and/or the acceleration information with respect to the rate of elevation change.

2. The system of claim 1, wherein the first satellite-positioning sensor, the first barometric sensor, the first acceleration sensor and the processor are within the portable electronic device.

3. The system of claim 1, wherein at least one of the first barometric sensor, the first satellite-positioning sensor and the first acceleration sensor is not within the portable electronic device, and wherein the at least one of the sensors not within the device is configured to communicate wirelessly with the device.

4. The system of claim 1, wherein the processor is arranged to calculate a satellite-based determined elevation statistically on the basis of several satellite-based altitude measurements.

5. The system of claim 1, wherein the processor is arranged to use atmospheric-pressure information in order to determine the rate of change of the elevation.

6. The system of claim 1, wherein the processor is arranged to use acceleration information in order to determine the rate of change of the elevation.

7. The system of claim 1, wherein the processor is arranged to calculate, on the basis of the rate of change of atmospheric pressure and/or acceleration information, an estimate for the rate of change of the elevation, wherein the processor is arranged to calculate a correction term for the altitude reading on the rate of change of the elevation and a time factor, and wherein the processor is arranged to add the correction term to the elevation determined on a satellite basis, in order to obtain a corrected altitude reading.

8. The system of claim 7, wherein the time factor is less than 600 ms.

9. The system of claim 1, wherein the processor is arranged to utilize the equation, $H_{t+1}=H_t+V_t\Delta t$, wherein $H_{t+1}$ is a new corrected altitude reading, wherein $H_t$ is a previous corrected altitude reading or an altitude reading determined directly on a satellite basis, wherein $V_t$ is the rate of change of the elevation, and wherein $\Delta t$ is a time factor between the moments of time t and t+1.

10. The system of claim 1, wherein the satellite-positioning sensor is arranged to change its state at intervals between an active state and a passive state, wherein, when the satellite-positioning sensor is in a passive state, the processor is arranged to use the most recent satellite-based altitude reading determined when the satellite-positioning sensor was in an active state.

11. The system of claim 1, wherein the processor is arranged to determine the reliability of an altitude reading determined on a satellite basis, and if the reliability meets a predefined criteria, the processor is configured to utilize the altitude reading determined on a satellite basis, or a corrected calculated altitude reading to determine a new corrected altitude reading.

12. The system of claim 1, wherein the device further includes memory for storing previous atmospheric-pressure data, wherein the device is configured to estimate the reliability of measurements, and wherein if the reliability meets a predefined criteria, the device is arranged to correct previous altitude values measured with only the aid of atmospheric pressure.

13. The system of claim 12, wherein if the reliability of an altitude reading determined on the satellite basis does not meet the predefined criteria, then the processor is arranged to use a previous altitude reading estimated to be reliable.

14. The system of claim 1, wherein the device is configured for estimating the reliability of a corrected altitude reading.

15. The system of claim 14, wherein the device is arranged to use an iterative or recursive algorithm, which is further arranged to make the altitude reading more correct continuously on the basis of measurement data.

16. The system of claim 15, wherein the device is configured to estimate the reliability of a corrected altitude reading are arranged to estimate the reliability on the basis of the stabilization time of an algorithm.

17. The system of claim 1, wherein the device further includes a display for showing a corrected altitude reading.

18. The system of claim 1, wherein the device is configured for calculating the direction and/or distance to a specified navigation point, and wherein the device further includes a display for showing the direction and/or distance and an altitude reading determined directly on a satellite or atmospheric-pressure basis, or the difference in altitude to the navigation point.

19. The system of claim 1, wherein the device is configured to provide a weather alert if a change in atmospheric pressure cannot be explained by a change in elevation, wherein the device is configured to utilize a corrected altitude reading.

20. The system of claim 1, further including a memory, and wherein the device is arranged to: determine and to record on the memory the altitude of the device with the aid of the first satellite-positioning sensor; change the first satellite-positioning sensor at least once from an active state to a passive state based upon pre-programming; and calculate a corrected altitude reading when the first satellite-positioning sensor is in a passive state, by utilizing the recorded elevation and the rate of change of the elevation, wherein the preprogramming can include at least one of when predefined reliability criteria for the elevation are met, a time basis, and in response to a command by a user.

21. A method for determining altitude of a portable electronic device including the steps of:
measuring the elevation of the device with the aid of a satellite-positioning system;
measuring atmospheric pressure with the aid of at least one of a barometric sensor and an acceleration sensor; and
determining a corrected elevation on the basis of a satellite-based measured elevation and at least one of an atmospheric-pressure measurement and an acceleration measurement, the corrected elevation is determined at least partly by correcting the satellite-based determined elevation afterwards on the basis of the rate of change of the elevation detected on the basis of at least one of the atmospheric-pressure measurement and the acceleration measurement.

22. The method of claim 21, wherein the corrected altitude reading is determined by adding to the elevation measured with the aid of the satellite-positioning system, the change in elevation determined with the aid of the rate of change of atmospheric pressure and a time factor, after determining the previous corrected altitude reading.

23. The method of claim 21, wherein the elevation is measured with the aid of the satellite-positioning system at least for as long as the reliability of the measurement result of the elevation meets a predefined criteria, and wherein when the measurement with the aid of the satellite-positioning system is interrupted, the corrected elevation is determined iteratively or recursively at preset intervals on the basis of the rate of change of the atmospheric pressure and of the previous determined elevation.

24. The method of claim 22, wherein the rate of change of the atmospheric pressure is determined independently of the satellite positioning.

* * * * *